No. 622,457. Patented Apr. 4, 1899.
J. B. FONDU.
MANUFACTURE OF TUMBLERS, GLASSES, VASES, &c.
(Application filed Feb. 12, 1898.)

(No Model.) 12 Sheets—Sheet 1.

WITNESSES:
Wm. D. Bell.
Robert J. Pollitt.

INVENTOR
Jean Baptiste Fondu
by
Sartur & Co.
ATTORNEYS

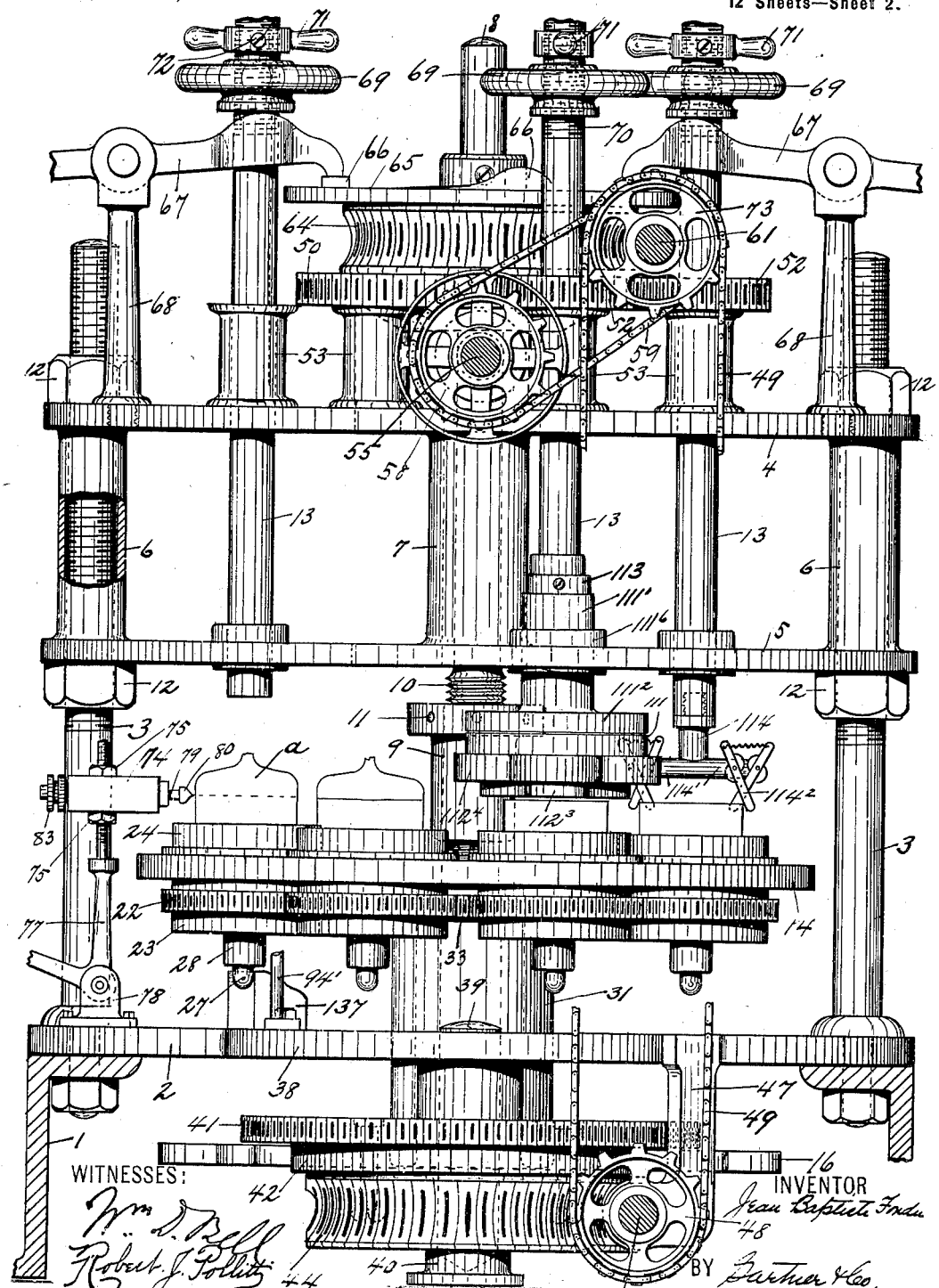

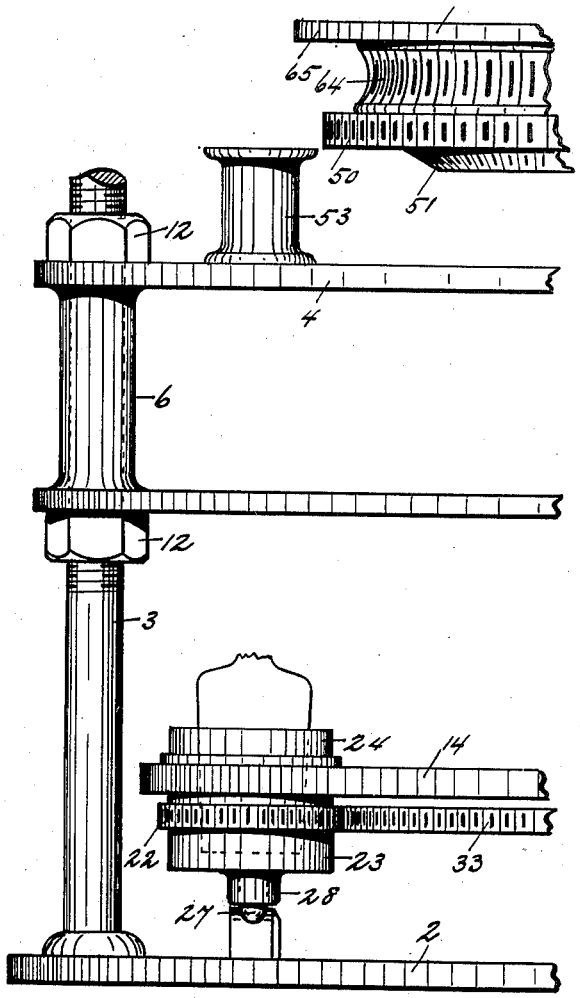

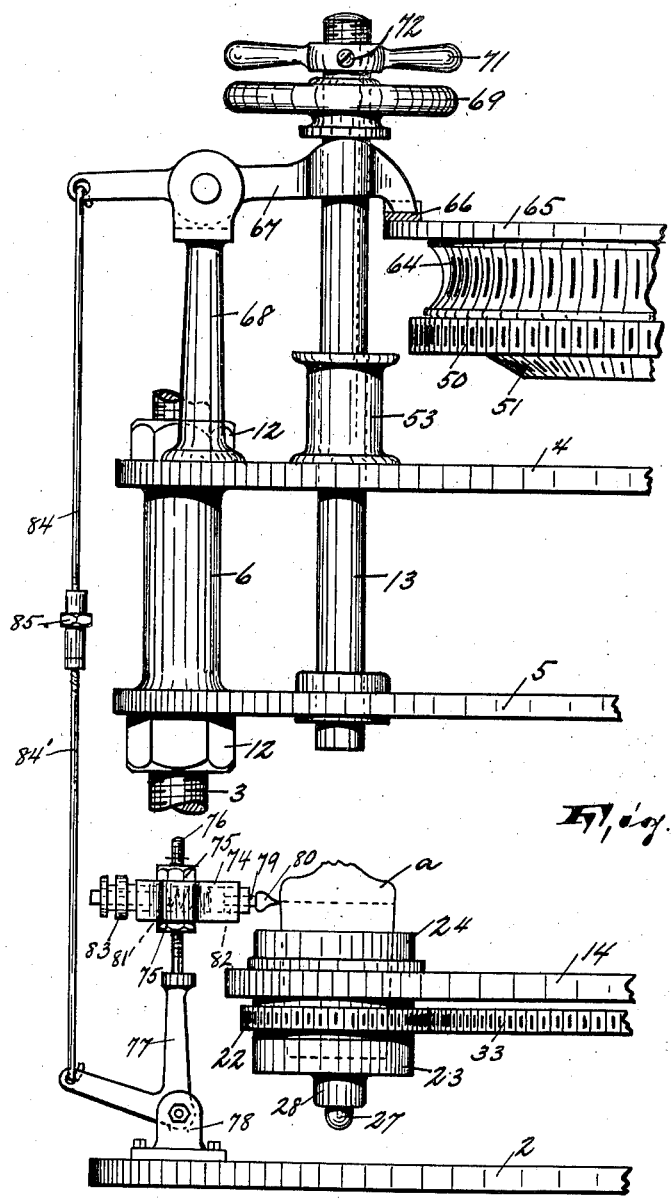

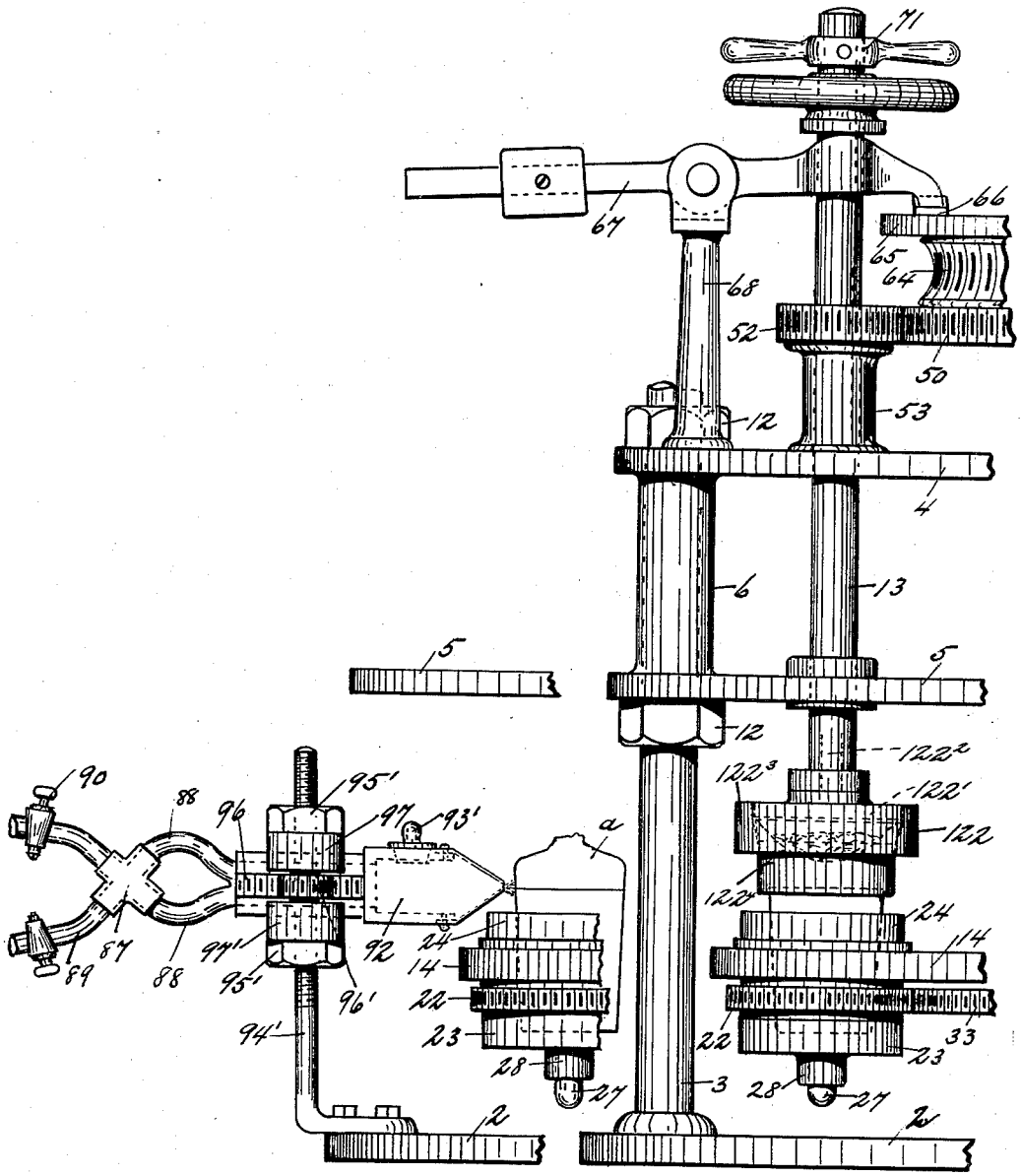

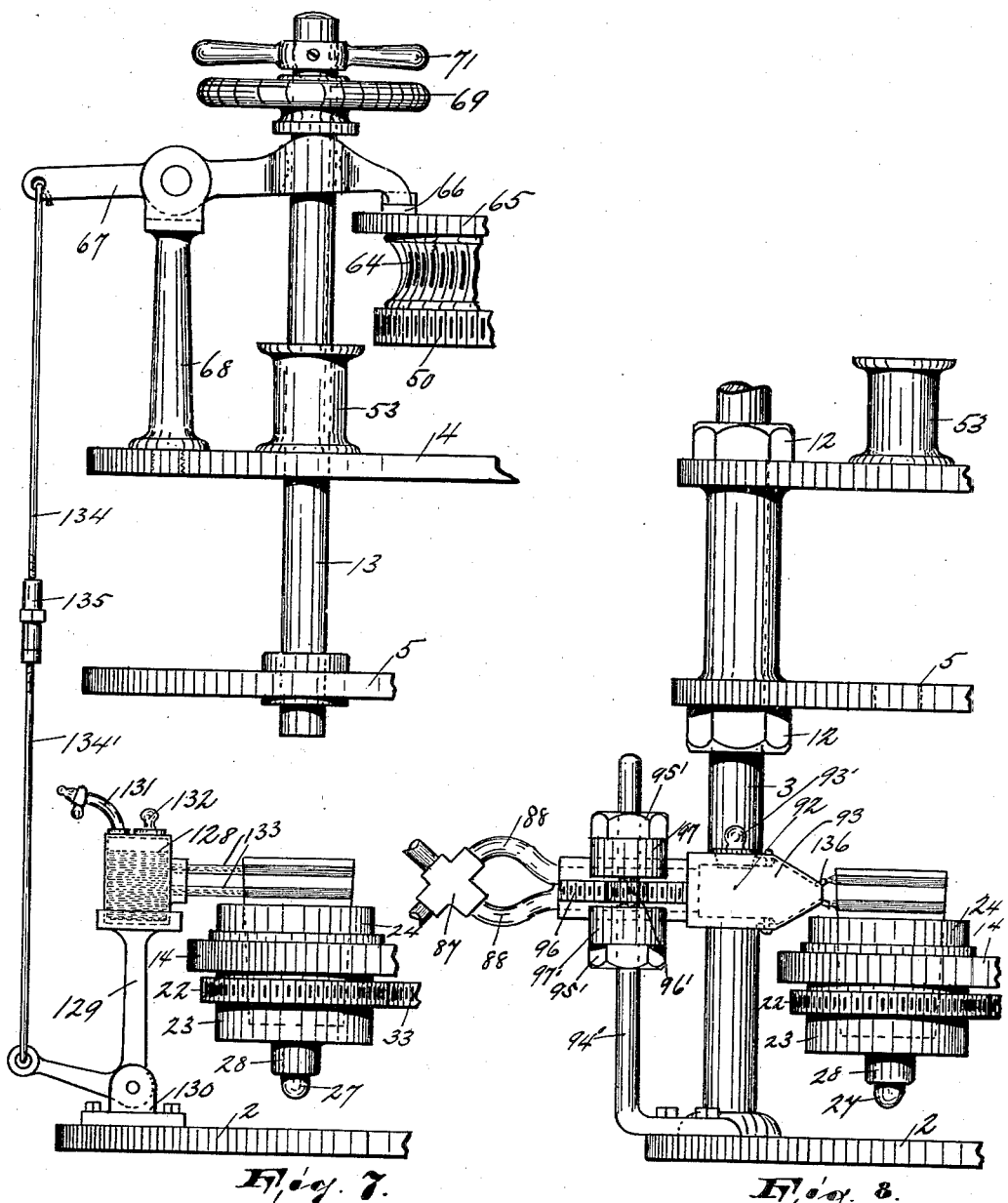

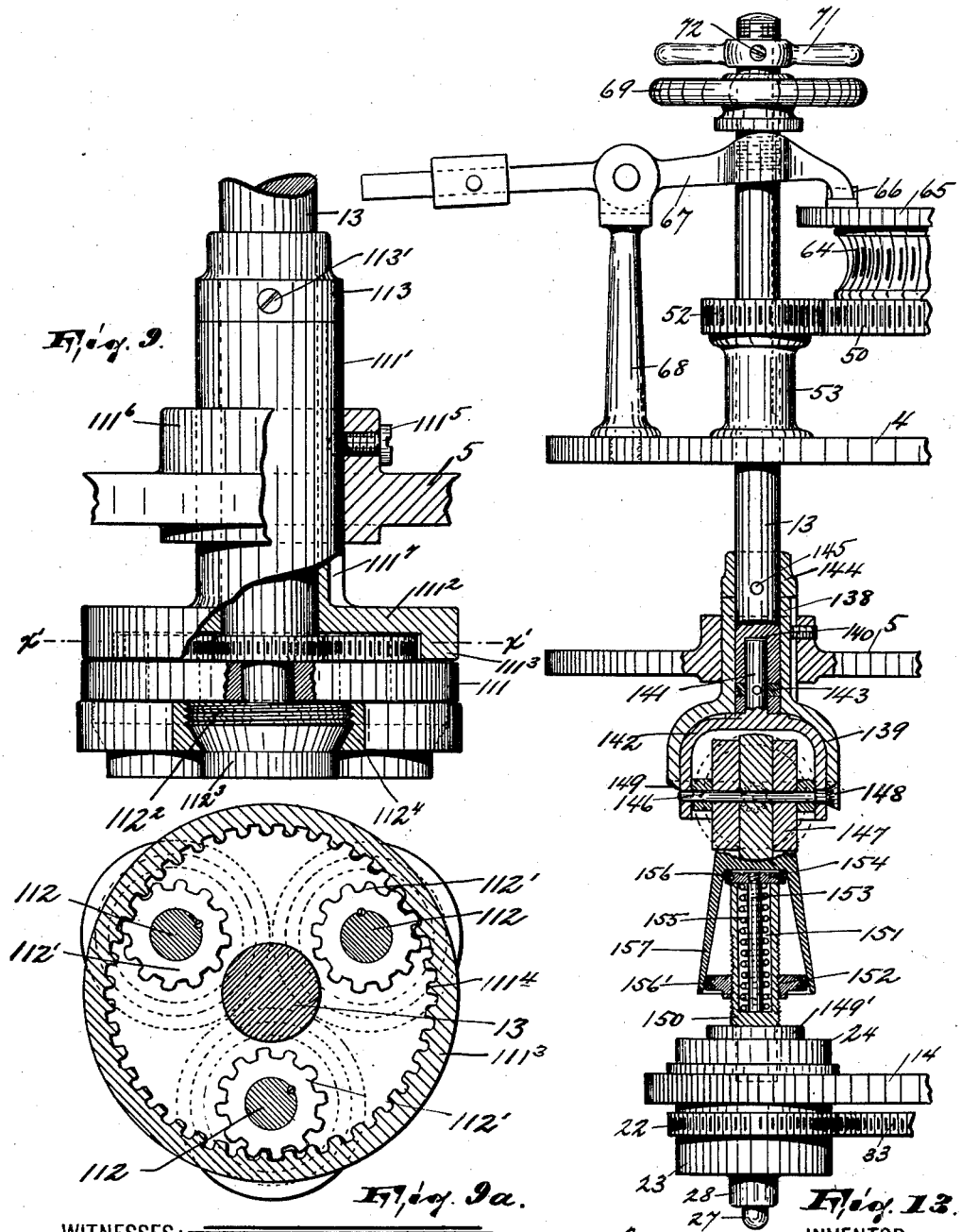

No. 622,457. Patented Apr. 4, 1899.
J. B. FONDU.
MANUFACTURE OF TUMBLERS, GLASSES, VASES, &c.
(Application filed Feb. 12, 1898.)
(No Model.) 12 Sheets—Sheet 8.
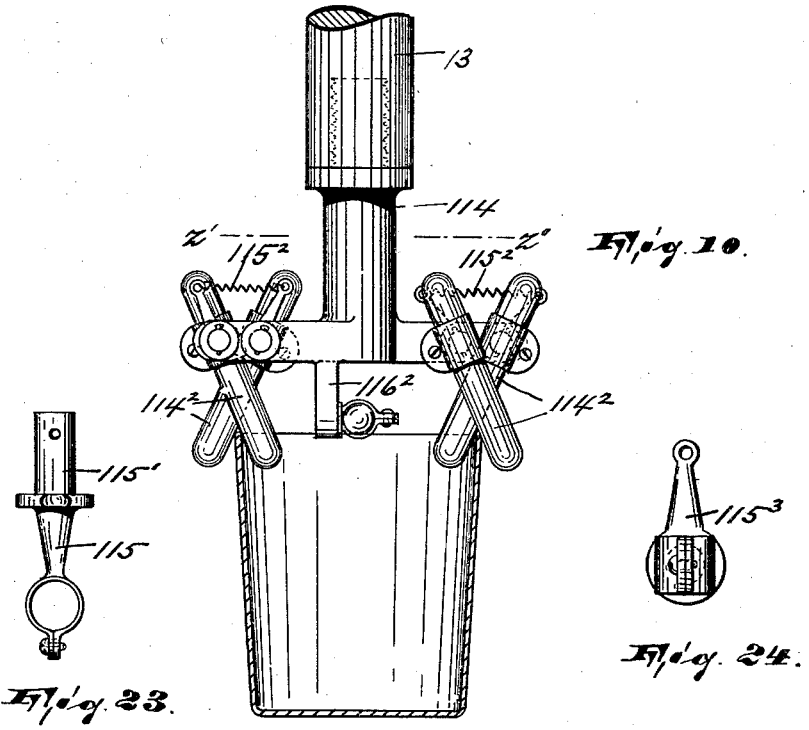
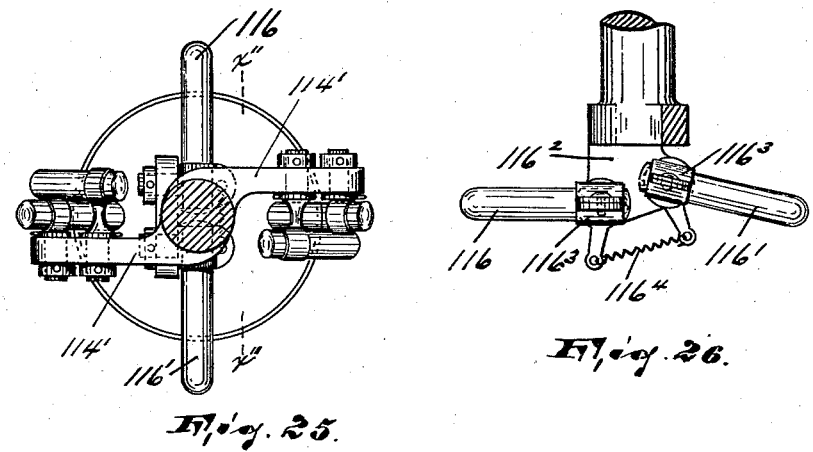
WITNESSES:
Wm D Bell
Robert J Pollitt
INVENTOR
Jean Baptiste Fondu
BY
Gartner & Co.
ATTORNEYS No. 622,457. Patented Apr. 4, 1899.
J. B. FONDU.
MANUFACTURE OF TUMBLERS, GLASSES, VASES, &c.
(Application filed Feb. 12, 1898.)
(No Model.) 12 Sheets—Sheet 9.

WITNESSES: INVENTOR
Wm. D. Bell. Jean Baptiste Fondu
Robert J. Pollitt. BY
Gartner & Co.
ATTORNEYS

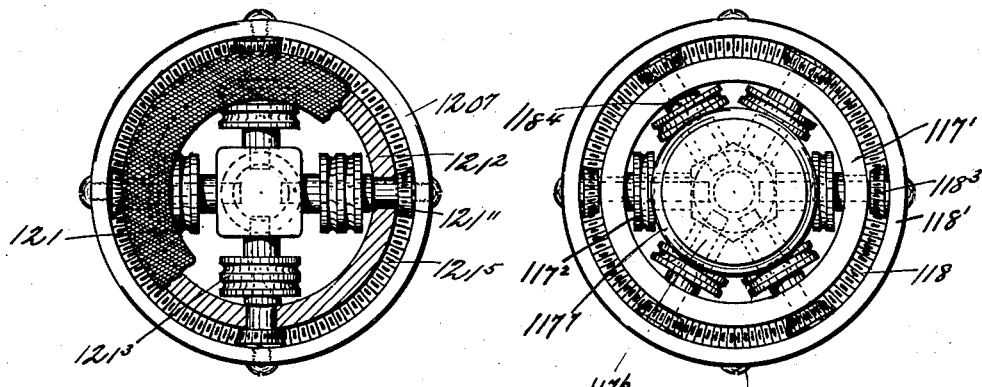

No. 622,457. Patented Apr. 4, 1899.
J. B. FONDU.
MANUFACTURE OF TUMBLERS, GLASSES, VASES, &c.
(Application filed Feb. 12, 1898.)
(No Model.) 12 Sheets—Sheet 11.
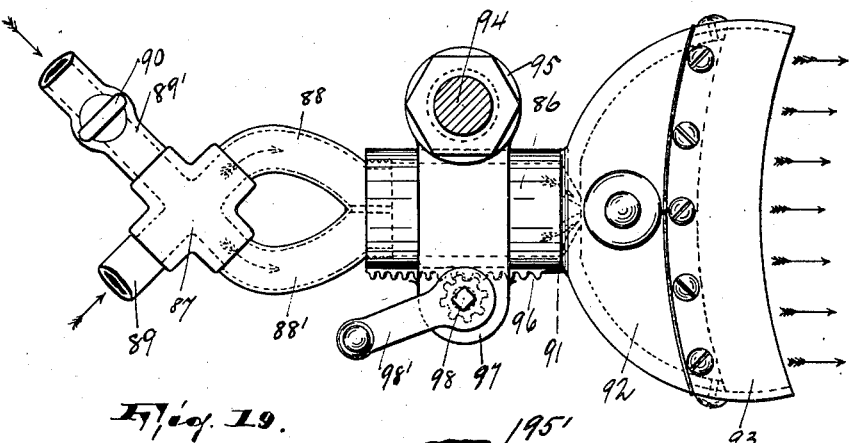
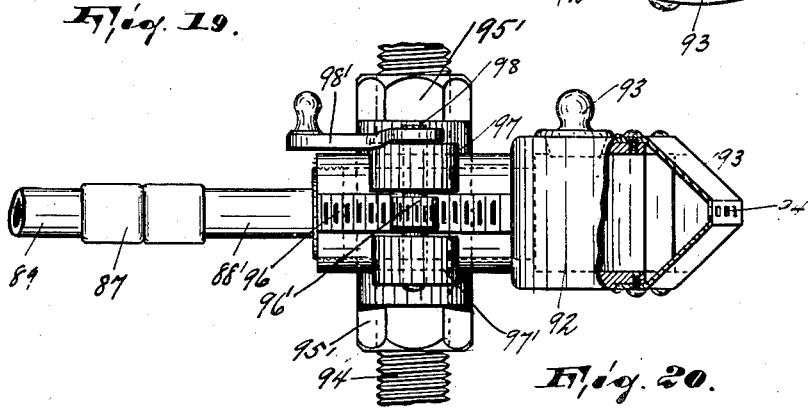
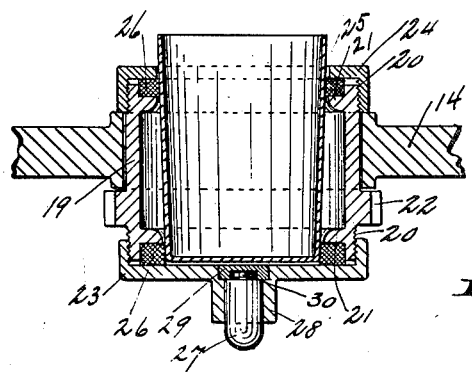
WITNESSES: INVENTOR
ATTORNEYS No. 622,457. Patented Apr. 4, 1899.
J. B. FONDU.
MANUFACTURE OF TUMBLERS, GLASSES, VASES, &c.
(Application filed Feb. 12, 1898.)
(No Model.) 12 Sheets—Sheet 12.

WITNESSES: Wm. D. Bell. Robert J. Pollitt.

INVENTOR Jean Baptiste Fondu
BY Gartner & Co.
ATTORNEYS

UNITED STATES PATENT OFFICE.

JEAN BAPTISTE FONDU, OF BRUSSELS, BELGIUM.

MANUFACTURE OF TUMBLERS, GLASSES, OR VASES, &c.

SPECIFICATION forming part of Letters Patent No. 622,457, dated April 4, 1899.

Application filed February 12, 1898. Serial No. 670,061. (No model.)

*To all whom it may concern:*

Be it known that I, JEAN BAPTISTE FONDU, a subject of the King of Belgium, residing at Brussels, Belgium, have invented certain new and useful Improvements in or Relating to the Manufacture of Tumblers, Glasses, Vases, and Similar Articles, of which the following is a specification.

The invention herein referred to relates to the manufacture of glass tumblers, and it has reference particularly to a machine for evenly or uniformly cutting or trimming off the tops of and ornamenting the blown tumblers and in the combination and arrangement of the various parts of said machine, substantially as will be hereinafter pointed out and finally embodied in the clauses of the claim.

The invention is fully illustrated in the accompanying drawings, wherein like letters and numerals of reference indicate corresponding parts in the several figures, and in which—

Figure 1:
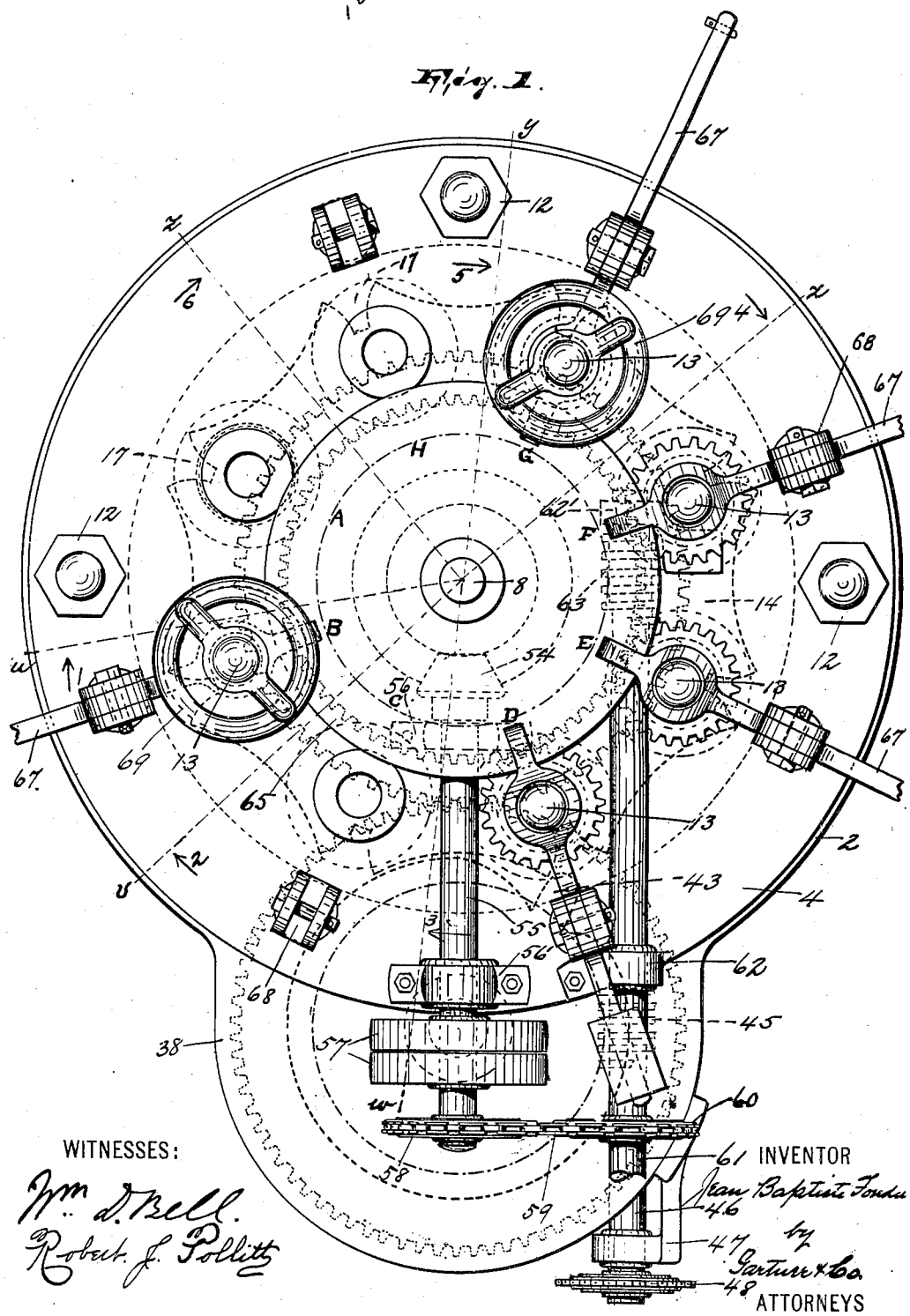
Figures 11, 12:
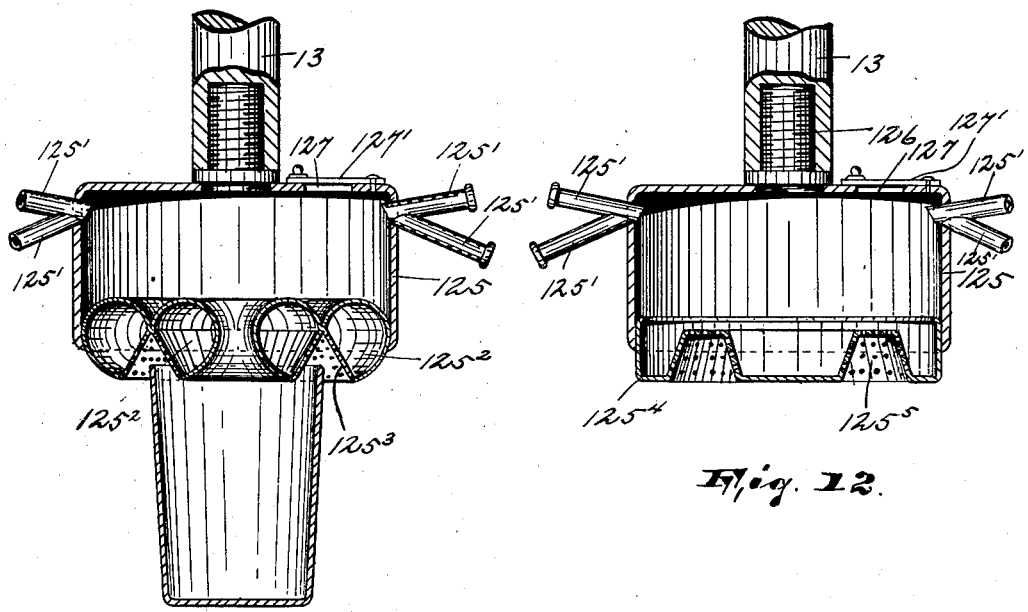
Figure 27:
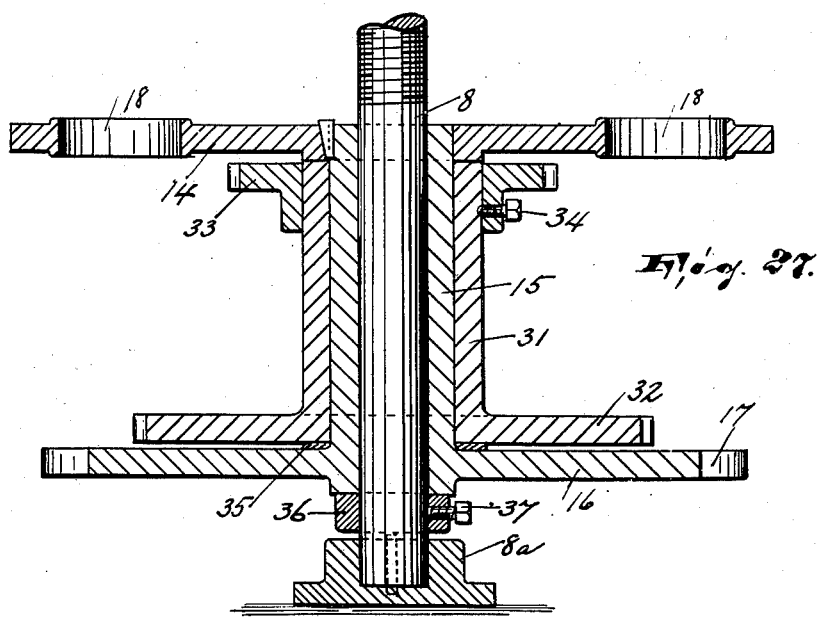
Figure 21:
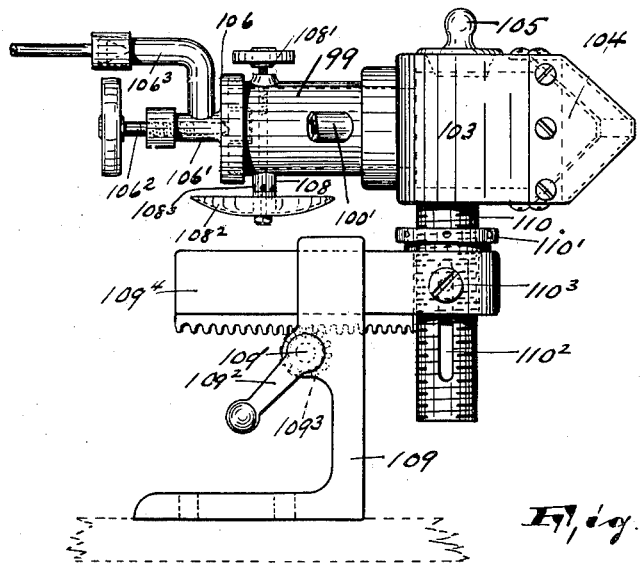
Figure 22:
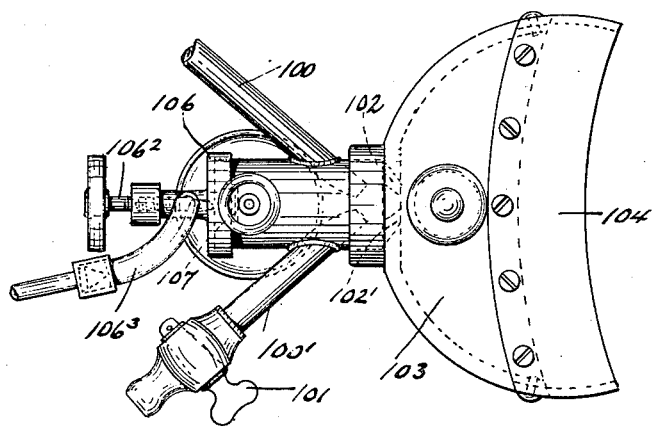

Figure 1 is a top plan view of the machine, certain parts being removed and others broken away. Fig. 2 is a view in side elevation of the machine as shown in Fig. 1, certain parts being removed and others being broken away. Fig. 3 is a side view taken on the line $u$ of Fig. 1, extending radially of the machine and looking in the direction of the arrow 1, certain parts being removed and others broken away. Fig. 4 is a view similar to Fig. 3, but taken on the radial line $v$ of Fig. 1 and looking in the direction of the arrow 2, certain parts being removed and others broken away. Fig. 5 is a view also similar to Fig. 3, but taken on the radial line $w$ of Fig. 1 and looking in the direction of the arrow 3, certain parts being removed and others broken away. Fig. 6 is a view also similar to Fig. 3, but taken on the radial line $x$ of Fig. 1 and looking in the direction of the arrow 4, certain parts being removed and others broken away. Fig. 7 is a view also similar to Fig. 3, but taken on the line $y$ of Fig. 1 and looking in the direction of the arrow 5, certain parts being removed and others broken away. Fig. 8 is a view also similar to Fig. 3, but taken on the radial line $z$ of Fig. 1 and looking in the direction of the arrow 6, certain parts being removed and others broken away. Fig. 9 is a view in side elevation of a certain tool shown in Fig. 2 and adapted to grind off plane the tops of the glasses. Fig. 9$^a$ is a sectional view on the line $x'$ $x'$ of Fig. 9. Fig. 10 is a view in side elevation of a certain tool shown in Fig. 2 and adapted to round off the tops of the glasses subsequently to the operation thereon of the tool shown in Fig. 9. Figs. 11 and 12 are views in side elevation, the latter view showing a modified form of the device shown in the former view, of a tool which may be substituted for that shown in Fig. 6. Fig. 13 is a view similar to Fig. 6, but showing in sectional view a tool which may be substituted for that shown in said last-named figure and adapted to grind the bottoms of the glasses. Figs. 14 and 15 are vertical sectional views, the latter figure showing a modified form of the device illustrated in the former figure, of tools which may be substituted for the tool shown in Fig. 10. Figs. 16 and 17, respectively, are bottom views of the devices shown in Figs. 14 and 15, certain parts in the latter figure being removed. Fig. 18 is a vertical sectional view of one of the holders for the glasses. Figs. 19 and 20 are enlarged detail top plan and side views, respectively, of the tool shown in Fig. 5. Figs. 21 and 22 are enlarged top and side views of a modified form of the tool shown in Figs. 5, 19, and 20. Figs. 23 and 24 are enlarged detail views of a portion of the tool shown in Fig. 10. Fig. 25 is a view of a modified form of the tool shown in Fig. 10 and taken on the line $z$ $z'$; Fig. 26 is a view taken on the line $x''$ $x''$ of Fig. 25, certain parts being removed; and Fig. 27 is a vertical sectional view taken on the line $y'$ $y'$ of Fig. 1.

The frame of the machine consists of a base 1, supporting a base-plate 2 and three or more threaded uprights or standards 3, which standards or uprights carry a pair of plates 4 5, which are rigidly connected by sleeves 6, penetrated by said standards or uprights, and a central sleeve 7, penetrated by an upright or standard 8, extending vertically and centrally through the said plate as well as the base-plate and mounted in and keyed to a step 8$^a$. The pair of plates is made adjustable upon its several uprights or standards by means of a lifting-nut 9 engaging threading 10 on the central upright or standard 8, and provided with suitable spanner-holes 11 for the reception of a spanner for operating it. Nuts 12, arranged on each standard above and below the pair of plates and engaging the threading of said standards, are adapted to hold the pair of plates in the position to which it is lifted by the lifting-nut.

13 indicates a series of tool-carrying spindles arranged vertically in the machine and penetrating the pair of plates, having suitable bearings therein.

14 designates a revoluble supporting-plate in which is adapted to be mounted the holders for the glasses hereinafter to be described. Said plate is keyed onto a sleeve 15, which is penetrated by and is revoluble about the central upright 8 and which carries at its lower end a scalloped disk 16, rigidly or integrally formed therewith and provided with peripheral notches 17 spacing its scallops. Said plate 14 is provided with a series of openings 18, in which are adapted to be revolubly mounted holders, one of which is shown in Fig. 18. Said holder consists of a cylindrical barrel or chamber 19, having an external threading 20 and an internal flange 21 at or near its lower as well as at or near its upper edge, and also having a series of gear-teeth 22 integrally formed upon and surrounding it.

23 indicates the bottom or base of the holder, and 24 indicates the cap therefor, said base and cap being provided with internal threading, which engages the teeth 20 of the barrel or chamber. The cap 24 is provided with an opening 25 for the reception of the tumbler or glass to be operated upon, and between said cap and the upper flange and also between the lower flange and the base or bottom 23 is arranged an annular elastic cushion 26. For a purpose hereinafter to be set forth the holder is provided with a vertically-movable pin 27, which is set in a nipple 28, integrally formed upon the base 23, and which pin is rounded off at its lower end and carries at its upper end a cushion or pad 29, suitably connected thereto, as by a threaded projection 30 on said pin.

It should be remarked that the series of holders is arranged with its members in positions relatively similar to those of the series of spindles 13.

31 designates a sleeve inclosing and revoluble about the sleeve 15 and provided at its lower end with an integral gear 32 and at its upper end with a pinion 33, detachably and adjustably secured thereto, as by set-screws 34. The gear 32, which forms a part of said sleeve 31, is spaced from the disk 16 by means of a spacing-washer 35, and said disk 16, together with its sleeve 15, the plate 14, the sleeve 31, the gear 32, and the pinion 33, is sustained by a collar 36, secured on the standard 8 by a set-screw 37.

From the base-plate 2 projects an extension 38, which is penetrated by a stub-shaft 39, having bearings therein at its upper end, and stepped in a circular block 40 at its lower end. Said stub-shaft carries a pinion 41 in engagement with the gear 32 and substantially the same size thereof, a cam 42, whose general peripheral contour conforms with the scallops of the disk 16, into each of which scallops it is adapted to successively fit, and which cam is provided with a finger 43, adapted to engage the notches 17 of said disk, and with a worm-wheel 44, which is engaged by a worm 45 on a worm-shaft 46, journaled in suitable bearings 47, suspended from the extension 38, said shaft receiving rotary movement from a sprocket-wheel 48, mounted at its outer end and engaged by the chain 49.

From the description just preceding it will be seen that when the sprocket-wheel 48 is revolved motion is imparted therefrom through the worm-shaft and worm to the worm-wheel, which rotates the stub-shaft 39 and the pinion and cam carried thereby, causing the former to rotate the gear 32 and through the latter the sleeve 31, the pinion 33, and each of the glass or tumbler holders in engagement with said pinion 33 and causing the former (said cam) to revolve in a scalloped portion of said disk 16 until its finger 43 engages one of the notches 17 in said disk to produce a partial rotation of the latter. Briefly, the motion initially imparted to the sprocket-wheel 48 results in a continual rotation of the individual holders containing the glasses and an intermittent and partial rotation of the plate 14, in which said holders are mounted.

The central standard 8 penetrates a pinion 50, carrying on its under face a bevel-gear 51 and suitably supported for free rotation upon the upper plate of the pair of plates 4 5. Said pinion is in mesh with a series of similar pinions 52, each keyed upon a spindle 13 and sustained in the same plane by spools or sleeves 53, resting upon the plate 4 and penetrated by said spindles. The bevel-gear is in mesh with a beveled pinion 54, mounted upon the near end of a drive-shaft 55, having bearings in suitable brackets 56 56', carried on the plate 4, said drive-shaft being the main shaft of the machine and being provided with belt-pulleys 57, whereby motion is imparted to it. At its free end said drive-shaft carries a sprocket-wheel 58, engaging a chain 59, passing over a tooth-wheel 60, mounted on a shaft 61, having bearings in brackets 62 62' and carrying a worm 63, which engages the teeth of a worm-wheel 64, also penetrated by said standard 8 and resting upon but freely revoluble with respect to the pinion 50. Said worm-wheel 64 carries, rigidly connected thereto, a plate 65, upon which is arranged a series of cams 66, adapted to actuate levers 67, fulcrumed in suitable supports 68 midway their ends and sustaining the spindles 13, which penetrate said levers and which are provided at their upper ends with hand-wheels 69, engaging threading 70 on said spindles, adjustment of the degree of movement of each of said levers and spindle being under the control of a stop 71, also engaging the threading on said spindle and provided with a set-screw 72. The shaft 61 drives the chain 49, which engages the teeth of a sprocket 73, carried on the end of said shaft. It should be noted at this point that the pitch of the worms 63 and 45 is such that the worm-wheels 64 and 44 are revoluble, the former in the direction of movement of the pinion 50 and the latter in a direction opposite that of the movement of said pinion 50. In view of these facts it will be seen that while the plate carrying the glass-holders is revolving intermittently said glass-holders and the spindles are individually revolving in opposite directions. At the same time by virtue of the cams 66, carried on the plate 65 and the levers 67, the spindles are being intermittently reciprocated. Hence while the machine is in normal operation the glasses contained in the holders are at uniform intervals of time each changed from a position beneath one spindle to a position beneath the one next succeeding.

Having described the general construction and operation of this machine, it remains now to describe the various tools which are employed in said machine in order to produce a complete or finished glass.

The machine may be considered as being susceptible of operating upon the glasses to produce three general results—viz., first, the rounding off and finishing of the tops; second, the planing off and finishing of the bottoms, and, third, the planing off and finishing of the sides of the glasses, so as to form faces thereon. Before the glasses are removed from the machine and after being subjected to the first of these operations an additional step, which involves decorating them, may be taken. This step will therefore be described hereinafter in connection with the steps involved in the operation of rounding off and polishing and otherwise finishing the tops of the glasses. Before proceeding to a detailed description of the tools employed in the first of these operations attention should be particularly called to Fig. 1, where the several positions of a glass while being operated upon are indicated by letters of reference from A to H. In the first of these positions a blown tumbler is placed in one of the holders. At the second of these positions its superfluous portion (marked $a$ in Fig. 2) is partially cut away from it by a tracing device. At the third position the line of tracing or cutting on said glass is subjected to the heat of a suitable burner in order that the effects of unequal expansion may be utilized toward producing when the superfluous portion is detached from the glass by a sharp blow as uniform an edge on the glass as possible. At the fourth position the top or edge of the glass is ground off flat or plane by a suitable grinding-tool. At the fifth position the flat or plane top or edge of the glass is rounded off by a device suitable for this purpose. At the sixth position the top is finished by a polishing-tool. At the seventh position the decorating material is applied, and at the eighth position said decorating material is burned into the glass.

The holder into which the glass is placed in the first position has been heretofore described and need not again be particularly referred to.

The tracing device which operates upon the glass in the second position may be described as follows: In a block 74, arranged adjustably by means of nuts 75 upon a pair of threaded pins 76, which latter are supported upon a bell-crank lever 77, fulcrumed in a support 78, bolted to the base-plate 2, is arranged a reciprocating pin 79, carrying at its inner end a diamond 80, whose point is adapted to impinge against and trace the glasses. Said pin and the diamond carried thereby are normally pressed inwardly by a spiral spring 81, disposed between an enlargement 82, near the front end of said pin, and an adjusting-nut 83, mounted in the block 74. By virtue of the fact that the diamond is pivotally movable about the fulcrum of the bell-crank lever 77 it is capable of being brought into and out of operative engagement with a glass. In order automatically to effect these movements of the diamond, said bell-crank lever is connected with the lever 67 by a pair of rods 84 84', reversely threaded at their adjoining ends and adjustably connected by a correspondingly-threaded double nut 85. It will be seen that the spindle 13 acts as a weight upon the lever 67 normally to carry the diamond into contact with a glass. When it is necessary to withdraw the diamond, the glass having been sufficiently traced, one of the cams 66 approaches the inner end of the lever 67, forcing the same upwardly, and consequently producing a withdrawal of the diamond. It will be seen that it will be only necessary to dispose the cams 66 properly upon the plate in order to produce the withdrawal of the diamond at the proper time.

The tool which is adapted to be employed in the second position is best shown in Figs. 19 and 20. This tool consists of a heating device which works upon the principle of an ordinary Bunsen burner. It consists of a reservoir 86, having connected therewith at its rear end a mixing device 87, which consists substantially of integrally-formed intersecting pipes communicating with said reservoir through tubes 88 88', and with an air-supply through an inlet 89 and a gas-supply through an inlet 89', controlled by a valve 90. At 91 said reservoir is provided with a contracted outlet whereupon a further mixing of the air with the gas is accomplished and which communicates with a chamber 92 of suitable shape and preferably integrally formed with said reservoir and to which chamber is removably secured a curved nozzle 93, which tapers outwardly, being provided along its reduced portion with a series of outlet-openings 94 for the combustible material. Said chamber 92 is provided with a cover or cap 93', which may be removed so as to permit the operator to ignite the combustible material. This device is adjustably mounted upon a threaded upright 94 by means of a sleeve 95, which is carried by said reservoir at one side thereof and which is penetrated by said upright, being arranged between two adjusting-nuts 95', that engage the threading on the latter. In order to effect a horizontal adjustment of the device toward and away from the glass being operated upon, the reservoir carries on one side, preferably the one opposite the side adjoining the sleeve 95, a rack 96, the teeth of which are adapted to be engaged by a pinion 96', disposed between two lugs 97 97', extending laterally from said sleeve and above and beneath as well as beyond said reservoir. In the free ends of the lugs is journaled a spindle 98, having a crank-handle 98' and carrying said pinion. It will be apparent that by manipulating the crank 98' the burner may be thrown to or from the glass.

In Figs. 21 and 22 I have illustrated a modification of the burner which has just been referred to above. This burner is adapted for the combustion of vapors or gases produced from a suitable mineral oil or other similar liquid that is supplied to said burner. Said burner consists of a reservoir 99, having in communication therewith, one on each side, tubes 100 100', one or both of which may be controlled by a cock 101. The front end of said reservoir is penetrated by two contracted orifices 102 102', which constitute feed-outlets to a chamber 103, having a nozzle 104 detachably secured thereto and substantially similar in shape and construction to the nozzle of the burner already described. Said chamber is provided with a removable cover or cap 105. The rear wall of said reservoir consists of a cap 106, having integrally formed therewith a tube 106', whose communication through said cap with the reservoir is controlled by a valve $106^2$, and from which projects a capillary feed-tube $106^3$. The inner end of said tube 106' is provided with a perforated platinum disk 107, suitably secured over the mouth thereof. Suspended from the bottom of said reservoir by a hollow stem 108, which communicates with said reservoir and which is controlled by a valve 108', is a shallow cup $108^2$. The burner now being referred to is mounted for both vertical and longitudinal adjustment upon the base-plate 2 on a vertical bracket 109, secured to said base-plate and affording bearings to a short spindle 109', one end of which carries a crank $109^2$ and the other end of which carries a pinion $109^3$, which pinion is adapted to engage with the teeth of a rack-bar $109^4$, adapted to slide in the upper portion of said bracket and penetrated at its free end by a screw 110, projecting downwardly from the burner-chamber and whose threading is engaged by the threading of an adjusting-nut 110', which rests upon the upper end of said rack-bar. To prevent the screw from turning in the rack-bar, said screw is provided with a longitudinal slot $110^2$, with which engages the inner end of a set-screw $110^3$. The operation of the burner now being referred to may be thus described: The liquid is fed from the capillary tube through the perforated platinum plate into the reservoir, whereupon after a sufficient quantity has been admitted to the apparatus to nearly fill the cup $108^2$, (into which it passes from orifices $108^3$, that are supplied in the hollow stem 108,) the valve $106^2$ is for a time closed. The liquid in the cup $108^2$ is then ignited, and when the heat developed has raised the temperature of the reservoir to a sufficient degree the valve $106^2$ is again opened to admit more of the liquid to the reservoir, wherein, owing to the high temperature of the latter, it at once turns to vapor. Before opening the valve $106^2$ the valve 108' is closed. Said vapor is then drawn by the air which is being ejected from the ends of the tubes 100 100' toward the front end of said reservoir, mixing with the air, the mixture escaping through the orifices 102 102' into the chamber 103 where, the cover of said chamber having been first removed for that purpose, said mixture is ignited by dropping a match into the chamber. If desired, instead of air entering at both of the tubes 100 100' air may be permitted to enter the reservoir through but one of said tubes, coal-gas being admitted through the other. A mixture of the air and coal-gas is then formed at once upon their escape from their respective tubes and the vapor that is being continually produced in the reservoir from the liquid emitted from the capillary tube combines with said mixture, producing a combination of gases which when ignited will afford a very intense heat. It will be apparent that after having initially produced a vapor in the reservoir 99 it is not necessary to keep the temperature of said reservoir raised by continuing to heat the same through the medium of the cup $108^2$ and its contents, for the heat evolved at the flame end of the burner will be alone sufficient to maintain the temperature of the reservoir for the purpose referred to.

In Fig. 9 I have illustrated a device for grinding off plane the tops of the glasses after they have been traced and heated along their lines of tracing by the devices heretofore referred to and have had their superfluous portions removed. This grinding device comprises one of the driving-spindles 13, at the lower end of which is formed a horizontal disk 111, and a holder consisting of a sleeve 111', provided at its lower end with an integral circular plate $111^2$, upon the under face of which is formed a circular flange $111^3$, having inside gear-teeth $111^4$, said sleeve extending through the plate 5 of the pair of plates 4 5 and being adapted for vertical but prevented from rotary movement by a set-screw $111^5$, extending through a bushing $111^6$ on the plate 5 and engaging a vertical slot $111^7$ in said sleeve. The disk 111 is penetrated by short spindles 112, to the upper end of each of which is keyed a pinion 112', that engages the teeth of the flange $111^3$ and at the lower end of which is integrally formed a peripherally-threaded disk $112^2$, which carries upon its lower face a lapidary device consisting of an emery or other suitable grinding-disk $112^3$, said disk being secured to the disk $112^2$ by means of a threaded ring $112^4$, which engages the threading of said disk $112^2$ and conforms substantially to a conical enlargement at the upper end of the grinding-disk $112^3$, this arrangement making it possible to remove the grinding-disk $112^3$, so as to change them for others. It will be seen that when the spindle 13 is revolved, since the toothed flange 113 remains stationary while the pinions are being carried around by the plate 111, in which they have bearings, said pinions and the grinding-disk to which they impart their movement are individually rotated. The spindle 13, which, as has been already stated in this case, forms a portion of the tool, is adapted to be vertically reciprocated in the manner, by the means, and for the purpose that have already been described to the general construction and operation of the machine. In order to remove this tool from the machine, it is necessary to raise the pair of plates 4 5 by means of the lifting-nut 9, whereupon after the hand-wheel 72 and stop 71 have been removed the tool may be lowered until the spindle is free from said pair of plates. In order to keep the parts of said tool assembled when the latter is in operation, a collar 113, having a set-screw 113', is mounted upon the spindle above the sleeve 111' and secured to said spindle by its set-screw. The tool to which the glass is next subjected is the one which is adapted to round off the flattened top of said glass. This tool is removably secured to the lower end of one of the spindles 13, and it consists of a central shaft 114, which is screwed into the spindle end and from which project in substantially opposite directions a pair of arms 114'. The end of each arm supports a pair of grinding-sticks $114^2$, composed of a suitable substance, preferably emery, and each provided with a clamp 115, whose shank portion 115' is revolubly mounted in one of said arms. The grinding-sticks are normally arranged in intersecting planes, their upper ends being drawn toward each other by a spring $115^2$, connecting projections $115^3$ on their clamps. A modified form of the tool now being referred to is shown in Figs. 25 and 26, wherein addition to those elements of said tool which have been referred to is seen a supplementary pair of grinding-sticks 116 116', the one of which, 116, is normally arranged in a substantially horizontal plane and the other of which is arranged in a slightly-inclined plane. This pair of grinding-sticks is pivotally mounted in an extension $116^2$ of the shaft 114, each of its members having a clamp $116^3$, substantially similar to that already described and being similarly connected by a spring $116^4$. This form of the tool will act upon substantially the whole of the top surface of the glass, so that there will exist practically no edges at all when the rounding off of the top by lapidary means is completed.

In lieu of the tool which I have just described may be used the other of the tools which are shown in Figs. 14 and 15, as well as Figs. 16 and 17.

Referring to Figs. 15 and 16, 13 indicates one of the spindles which constitutes a part of the tool, the same as in the tool shown in Fig. 9, and near the lower end of which is integrally formed a flanged disk 117, in the flange 117' of which and in the end of the spindle are journaled pairs of diametrically opposed grinding-wheels $117^2$, having circumferential grooves $117^3$, adapted to receive the top of the glass to be operated upon. Extending upwardly into said spindle is a bore $117^4$, into which projects a stem $117^5$, carrying at its lower end a disk $117^6$, having a circumferential rubber ring or cushion $117^7$. The disk and stem are adapted to act upon the glass, so as to steady the same while being operated upon by the grinding-wheels $117^2$, and it is cushioned from the spindle 13 by a spiral spring $117^8$, disposed between the upper end of the bore and a disk $117^9$ upon the free end of the stem $117^5$. To prevent the displacement of the stem when the spindle is lifted, an annular groove $117^{10}$ is formed near the upper end of said stem, being engaged by one or more pins $117^{11}$, set in the spindle before the parts are assembled. Motion is imparted to the grinding-wheels $117^3$ by means of an annular beveled rack 118, removably secured to the inside of a holder or socket 118' by screws $118^2$, said rack engaging bevel-pinions $118^3$ at the ends of the shafts $118^4$ of the respective grinding-wheels. Said socket or holder is situated at the lower end and forms an integral portion of a sleeve 119, which, like the sleeve of the tool shown in Fig. 9, is guided for vertical movement by a set-screw 119', engaging a longitudinal slot $119^2$ in said sleeve, and held in position by a collar $119^3$, secured to the spindle by a set-screw $119^4$.

The tool shown in Figs. 14 and 17 constitutes a slight modification of the tool last described. In this device the flanged disk 120 is separable from the spindle 13, its upwardly-extending stem 120' being received by the bore $120^2$ at the lower end of said spindle and the parts being cushioned by a spiral spring $120^3$, disposed between the top of the bore and the upper end of said stem. To obviate displacement of the flanged disk from the spindle when the parts are assembled, the stem of the former is provided with a vertically-extending recess $120^4$, which is penetrated by a pin $120^5$, that is set in the spindle and which has a less vertical dimension than said recess, so as to permit a slight movement between the flanged disk and the spindle. The lower end of the spindle is provided with a surrounding flange 120⁶, which abuts against the upper wall of the socket 120⁷. In this instance the glass is steadied by means of an annular rubber ring 121, secured by means of a dovetailed joint 121' to the flange 121² of the disk 120. This tool may be provided with grinding-wheels 121³, substantially the same in construction and arrangement as the grinding-wheels shown in Figs. 15 and 16. A slight variation in their construction, however, is shown, which consists in providing the grinding-wheels with two instead of one peripheral recess 121⁴. As in the device shown in Figs. 15 and 16, these grinding-wheels are rotated by means of an annular bevel-rack 121⁵, which is secured to the inside of the socket and pinions 121¹¹. The screws 121⁶ for securing this rack in place are set in slots 121⁷, so as to render the rack adjustable. It should be remarked that as in the tool shown in Figs. 15 and 16 a sleeve 121⁸ is integrally formed with and projects upwardly from the holder 120⁷, being similarly connected by a slot and set-screw arrangement, and is also similarly prevented from vertical movement on the spindle by a collar 121, having a set-screw 121¹⁰. It should be noted that since the rubber cushion 121 revolves with the tool proper it has no such engagement with the glass as will materially retard the movement of the tool, but is merely adapted to keep the glass in proper position relatively to the recesses in the grinding-wheels.

The tool to which the glass is next subjected is shown in Fig. 6. This tool consists of an inverted cup 122, which comprises a disk 122', integrally formed upon the end of a threaded stem 122², that is screwed into the lower end of the spindle 13, and a ring 122³, which is screwed into said disk and which surrounds a pad 122⁴, that is conical in shape. The inner formation of the ring corresponds to the shape of the pad, so as to retain the latter in position. The pad is provided with a recess formed in its upper face, in which recess is adapted to be placed a mixture of tin-putty and oil. The pad is composed of a porous material—say of cork or felt—which is not only permeable for the passage of the above-mentioned mixture as a lubricant, but which is also suitable as a polishing substance. It will be found that by using this tool after the glass being operated upon has come from the lapidary devices the top edge of the glass, which must be in a more or less roughened condition, will be nicely rounded off.

It may be preferred to complete the rounding off of the tops of the glasses by subjecting them to the action of heat, whereupon they will become softened and upon cooling will of themselves assume the rounded form. Hence I have provided the burners shown in Figs. 11 and 12. In the former figure said burner consists of a mixing chamber or reservoir 125, having communicating therewith duplicate mixing-nozzles 125', one of the members of which is adapted to admit gas and the other of the members of which is adapted to admit air. The bottom wall of this chamber consists of a pair of concentrically-arranged tubes 125², the adjoining portions of the walls of which are flattened for a short distance from their line of coincidence, as at 125³, said portions of their walls being perforated. The burner shown in Fig. 12 is substantially similar to that shown in Fig. 11, with the exception of a slight modification in the shape of its lower wall, said wall in this case consisting of an inverted-cup-shaped nozzle 125⁴, having a substantially rectangular perforated depression 125⁵. The burners shown in both of the views now under consideration are each secured to a spindle by a threaded stem 126, projecting upwardly from said burner and adapted to be screwed into said spindle. Since there is no necessity for the spindle being rotated when the tool now in question is carried by it, the driving-pinion 52 for said spindle, which has been described as being keyed thereon, may be removed. Both of said burners, moreover, are provided with an igniting-aperture 127, having a pivoted cover 127'.

The device shown in Fig. 7 constitutes the tool whereby the decorating of the glass is accomplished. Said tool consists of a suitable receptacle 128, supported on one arm of a bell-crank lever 129, fulcrumed in a standard 130, that is mounted upon the base-plate 2. The receptacle may be connected with a compressed-air supply through a valve-controlled tube 131, extending from its upper wall, and it is provided with a suitable cover 132, which should preferably be screwed into said receptacle. From the front wall of the receptacle project two or more brushes consisting of short tubes 133, which communicate with said receptacle and each of which is provided at its free end with a feed device composed of some suitable porous material. The liquid which is to be used for decorating the glass is first placed in the said receptacle, whereupon, having screwed in place the cover, the compressed air is admitted, acting to force the liquid into the tubes and through the porous material at their ends. In order to automatically throw this decorating-tool into and out of operative contact with the glass at the proper intervals of time, the free arm of its bell-crank lever is connected with the lever 67 by means of rods 134 134', connected at their adjoining ends by a reversely-threaded nut 135, the construction and operation of that part of the machine now being referred to being substantially similar to the construction and operation of the corresponding elements shown in Fig. 4.

Having passed the decorating apparatus, the glass being operated upon is next subjected to a heating device, so as to burn the decorating material into the glass. This tool is shown in Fig. 8, in which it appears as being substantially like the tool shown in Fig. 5, with the exception that it has two sets of gas-orifices 136, one set for each band of decorating material. If desired, the modified form of the tool shown in Fig. 5, which modified form is also illustrated in Figs. 21 and 22, may be substituted for the one above referred to and illustrated in Fig. 8, it being only necessary, of course, to duplicate the gas-orifices.

After having been subjected to the action of the various tools which have been just described and at a point between position H and A, as designated in Fig. 1, the glass is loosened in its socket by means of a cam 137, mounted upon the base-plate 2 and adapted to receive the impact of the pin 27 in the bottom of each glass-holder, so as to slightly dislocate the glass, which may then be lifted from the holder.

Having thus fully described the construction and operation of the tools employed for working upon the tops of the glasses, it remains to describe those tools which are adapted to work upon the bottoms of the glasses and also upon the sides thereof.

A tool for grinding the bottoms of the glasses is shown in Fig. 13, in which 138 designates the sleeve integrally formed with and projecting upwardly from the socket 139 of the tool and which, like the analogous devices that have heretofore been described, is guided for vertical movement only in the lower one of the pair of plates 4 5 by a longitudinal slot and set-screw arrangement. The lower end of the spindle 13, which penetrates said sleeve 138, receives in its bore 140 a stem 141 of a socket 142, said stem being removably held in said spindle by means of a key 143, penetrating both the spindle and the stem. The socket 142 prevents relative downward movement of the holder and its sleeve, and a collar 144, secured to the spindle 13 by a set-screw 145, prevents an upward relative movement of these parts. The socket 142 affords bearings for a horizontal shaft 146, which carries keyed thereto a series of grinding-disks 147, preferably three in number, the intermediate one of which has a greater diameter than the other two and a rounded periphery. Said intermediate disk is adapted to grind out a concavity in the bottom of the glass being operated upon, whereas the other two are adapted to grind off plane the base portion of the glass which surrounds said cavity. Said shaft and the grinding-disks carried thereby are rotated by a pinion 148, which it carries at one of its ends and which engages rack-teeth 149, formed on the bottom of said socket. The mandrel which supports the glass to be operated upon consists of an internally-threaded block 149', which is set into a holder 24 and into which is screwed a standard 150, having a longitudinal bore 151. Said standard is surrounded by a ring 152, which is screwed thereon near its lower end, and it receives a spindle 153, carrying a disk 154, screwed onto its upper end and normally forced in an upward direction by a spring 155, surrounding it and disposed between said disk 154 and the bottom of the bore. The disk 154 and the ring 152 are each surrounded by a rubber annulus 156 156', respectively, which acts as a cushion for the glass 157. The rotation of the spindle relatively to the holder 24, and consequently the glass which is indirectly carried thereby, and the reciprocating movement of the spindle and the tool which it carries are similar to the corresponding movements that have heretofore been described with reference to the machine in general.

In the use of the tool which is above referred to the machine is used as a double-acting one. In order that the operation upon the bottoms of the glasses may be quickly as well as nicely done, three sets or kinds of grinding-disks are provided, in one of which sets the grinding-disks may be composed of cast-iron, in another of which sets said grinding-disks may be composed of sandstone, and in the other of which they may be composed of felt, in which last-named case a mixture of finely-powdered sand and water is fed by the operator onto the disk. In view of the foregoing it is therefore preferable to place the glass in position at A and at H, to provide a tool (shown in Fig. 13 and above described) with the cast-iron grinding-disks, placing a tool of this character on each of the positions B and F, to place tools having the sandstone disks at the positions C and G, and to place the tools having the felt disks at the positions D and H. Thus two glasses will be operated upon by the same kind of tools simultaneously, and they will each be subjected to the graduated treatment afforded by the different kinds of disks which the tools carry. When the machine is thus operating as a double-acting one, the cam 137 is duplicated, said cams being placed diametrically opposite to each other, the one being between the positions H and A and the other between the positions D and E.

The sides of the glasses are ground by the tool substantially like that which I have above described, any suitable means being provided for rotating the glass intermittently relatively to its mandrel, so as to subject the new portion of its surface to the action of said tool. This turning of the glass on its mandrel may be done manually by the operator, or, if desired, means for automatically accomplishing said turning may be provided. In order that the disk which is used may work upon the side of the glass, the standard is bent obliquely near the block 149. It need only be further said that instead of three grinding-disks one grinding-disk may be provided having a plane periphery.

Having thus fully described my invention, what I claim as new, and desire to secure by Letters Patent, is—

1. In a machine for shaping blown-glass tumblers, the combination, with a frame and with tools for simultaneously operating upon some or all of the tumblers suitably mounted in said frame, of a tumbler-support revolubly mounted in said frame and means for imparting intermittent partial rotary movements to said support to bring the tumblers successively into operative contiguity to the respective tools, substantially as described.

2. In a machine for shaping blown-glass tumblers, the combination, with a frame and with tools for operating upon the tumblers suitably mounted in said frame in contiguity to the tumblers, of a pair of parallel shafts journaled in said frame, a tumbler-support revolubly mounted about one of said shafts, a notched disk rigidly connected to said tumbler-support and revoluble therewith, a cam mounted upon the other of said shafts and adapted to engage said notched disk and means for rotating said last-named shaft, substantially as described.

3. In a machine for shaping blown-glass tumblers, the combination, with a frame and with tools for operating upon the tumblers suitably mounted in said frame in contiguity to the tumblers, of a pair of parallel shafts journaled in said frame, a tumbler-support revolubly mounted about one of said shafts, a notched scalloped disk rigidly connected to said support and revoluble therewith about said first-named shaft, a cam mounted upon the other shaft and adapted to engage the scallops and the notches thereof, to intermittently effect partial rotary movements of said support, and means for operating said last-named shaft, substantially as described.

4. In a machine for shaping blown-glass tumblers, the combination, with a frame and with tools for operating upon the tumblers suitably mounted in said frame in contiguity to the glasses, of a pair of parallel shafts journaled in said frame, a tumbler-support revolubly mounted about one of said shafts, toothed tumbler sockets or holders revolubly mounted in said support and concentrically therewith, a notched scalloped disk rigidly connected to said support and revoluble therewith about said first-named shaft, a cam mounted upon the other shaft and adapted to successively engage the scallops and the notches thereof to intermittently effect partial rotary movements of said support, a pinion secured to said last-named shaft, a suitable system of gearing operatively connecting said pinion and the toothed sockets or holders and means for operating said last-named shaft, substantially as described.

5. In a machine for shaping blown-glass tumblers, the combination, with a frame and a pair of parallel shafts journaled in said frame, a tumbler-support revolubly mounted about one of said shafts, toothed tumbler sockets or holders revolubly mounted in said support and concentrically therewith, a notched scalloped disk rigidly connected to said support and revoluble therewith about said first-named shaft, a cam mounted upon the other shaft and adapted to successively engage the scallops and the notches thereof to intermittently effect partial rotary movements of said support, a pinion secured to said last-named shaft, a suitable system of gearing operatively connecting said pinion and the toothed sockets or holders, tool-carrying spindles revolubly mounted in said frame above said support, a drive-shaft journaled in said frame and means for operatively connecting said spindles and said cam and disk-carrying shaft with said drive-shaft, substantially as described.

6. In a machine for shaping blown-glass tumblers, the combination, with a frame, of a pair of parallel shafts journaled in said frame, a tumbler-support revolubly mounted about one of said shafts, toothed tumbler sockets or holders revolubly mounted in said support and concentrically therewith, a notched scalloped disk rigidly connected to said support and revoluble therewith about said first-named shaft, a cam mounted upon the other shaft and adapted to successively engage the scallops and the notches thereof to intermittently effect partial rotary movements of said support, a pinion secured to said last-named shaft, a suitable system of gearing operatively connecting said pinion and the toothed sockets or holders, tool-carrying spindles revolubly mounted in said frame above said support, a drive-shaft journaled in said frame, pinions keyed on some of said spindles, another pinion secured to said first-named shaft and engaging said spindle-pinions, and means for operatively connecting said pinion and the disk and cam carrying shaft with said drive-shaft, substantially as described.

7. In a machine for shaping blown-glass tumblers, the combination, with a frame, of a pair of parallel shafts journaled in said frame, a tumbler-support revolubly mounted about one of said shafts, toothed tumbler sockets or holders revolubly mounted in said support and concentrically therewith, a notched scalloped disk rigidly connected to said support and revoluble therewith about said first-named shaft, a cam mounted upon the other shaft and adapted to successively engage the scallops and the notches thereof to intermittently effect partial rotary movements to said support, a pinion secured to said last-named shaft, a suitable system of gearing operatively connecting said pinion and the toothed sockets or holders, tool-carrying spindles revolubly mounted and adapted to reciprocate in said frame above said support, a drive-shaft journaled in said frame, pinions keyed on some of said spindles, another pinion secured to said first-named shaft, means for operatively connecting said pinion and the disk and cam carrying shaft with said drive-shaft and means operatively connecting said first-named shaft and the spindles for reciprocating the latter, substantially as described.

8. In a machine for shaping blown-glass tumblers, the combination, with the frame, of a tumbler-support revolubly mounted in said frame, tumbler holders or sockets concentrically and revolubly arranged in said support, tool-carrying spindles revolubly mounted in said frame above said support and adapted to reciprocate in said frame, means for imparting to said support intermittent rotary movements, means also for revolving said tumbler-holders and the spindles in opposite directions, and means for reciprocating said spindles simultaneously with the movements of said support, substantially as described.

9. In a machine for shaping blown-glass tumblers, the combination of a frame comprising a base, a plate or plates mounted above the same, a suitably-supported shaft penetrating said base and the plates and a lifting-nut for said plates having a screw-thread engagement with said shaft, a tumbler-support mounted in said frame and tool-carrying spindles slidingly arranged above said tumbler-support in and penetrating said plates and means for operating said spindles, substantially as described.

10. In a machine for shaping blown-glass tumblers, the combination, with a frame, of a tumbler-support revolubly mounted in said frame, and means for successively detaching the superfluous tops of said tumblers, planing the edges so formed, rounding off said edges and polishing said edges, substantially as described.

11. In a machine for shaping blown-glass tumblers, the combination, with a frame, of a tumbler-support revolubly mounted in said frame, and means for successively detaching the superfluous tops of said tumblers, planing off the edges so formed, rounding off said edges, polishing said edges, and decorating the glass, substantially as described.

In testimony that I claim the foregoing I have hereunto set my hand this 18th day of January, 1898.

JEAN BAPTISTE FONDU.

Witnesses:
J. V. H. POHLEY,
GREGORY PHELAN.